US011490608B1

(12) United States Patent
Klawansky

(10) Patent No.: US 11,490,608 B1
(45) Date of Patent: Nov. 8, 2022

(54) GIMBAL FOR A FISHING ROD BUTT

(71) Applicant: Ethan Klawansky, Brooklyn, NY (US)

(72) Inventor: Ethan Klawansky, Brooklyn, NY (US)

(*) Notice: Subject to any disclaimer, the term of this patent is extended or adjusted under 35 U.S.C. 154(b) by 0 days.

(21) Appl. No.: 17/496,549

(22) Filed: Oct. 7, 2021

(51) Int. Cl.
*A01K 97/10* (2006.01)
*F16M 11/12* (2006.01)
*A01K 97/00* (2006.01)

(52) U.S. Cl.
CPC ............ *A01K 97/10* (2013.01); *A01K 97/00* (2013.01); *F16M 11/123* (2013.01)

(58) Field of Classification Search
CPC ...... A01K 97/10; A01K 97/125; A01K 97/00; A01K 97/12; A01K 97/08; F16M 11/123; F16M 11/18; F16M 11/242; Y10S 224/922
USPC ..................................... 43/21.1, 17
See application file for complete search history.

(56) References Cited

U.S. PATENT DOCUMENTS

| | | | | |
|---|---|---|---|---|
| 3,531,888 A * | 10/1970 | Wells | ............ | A01K 87/00 43/21.2 |
| 4,083,141 A * | 4/1978 | Shedd | ............ | A01K 87/02 43/22 |
| 4,535,561 A * | 8/1985 | Hlava | ............ | A01K 87/06 43/22 |
| 4,637,157 A * | 1/1987 | Collins | ............ | A01K 87/06 43/22 |
| 4,682,438 A * | 7/1987 | Arrow | ............ | B63B 29/04 297/14 |
| 5,890,313 A * | 4/1999 | Collins | ............ | A01K 87/06 43/22 |
| 5,987,803 A * | 11/1999 | White | ............ | A01K 97/10 43/21.2 |
| 6,176,034 B1 * | 1/2001 | Collins | ............ | A01K 87/08 43/22 |
| 6,185,856 B1 * | 2/2001 | Yakabe | ............ | A01K 97/10 224/922 |
| 7,313,886 B2 * | 1/2008 | Brown | ............ | A01K 97/08 43/21.2 |
| 8,800,197 B2 * | 8/2014 | Wilcox | ............ | A01K 97/10 114/364 |
| 9,232,778 B1 * | 1/2016 | De Sernia | ............ | A01K 97/10 |
| 11,172,665 B2 * | 11/2021 | McQuade | ............ | A01K 97/10 |
| 2005/0102881 A1 * | 5/2005 | Legendziewicz | ....... | A01K 97/10 43/21.2 |
| 2010/0205847 A1 * | 8/2010 | Hawley | ............ | A01K 97/10 114/364 |
| 2014/0366427 A1 * | 12/2014 | Baker, III | ............ | A01K 97/10 248/75 |
| 2015/0000177 A1 * | 1/2015 | Liney | ............ | A01K 97/10 43/21.2 |

* cited by examiner

*Primary Examiner* — Nkeisha Smith
(74) *Attorney, Agent, or Firm* — KOS IP Law LLP

(57) ABSTRACT

A fishing rod butt includes a tubular member defining a proximal end and a distal end. The distal end of the tubular member is configured to be coupled with a fishing rod. A gimbal assembly is supported at the proximal end of the tubular member. The gimbal assembly includes a gimbal rotatably coupled with the proximal end of the tubular member. The gimbal allows the tubular member to rotate with respect to the gimbal. A washer is arranged between the proximal end of the tubular member and the gimbal. The washer prevents the proximal end of the tubular member from directly contacting the gimbal.

18 Claims, 5 Drawing Sheets

GIMBAL FOR A FISHING ROD BUTT

FIELD

The present disclosure relates to a gimbal, and more particularly, to a gimbal for a fishing rod butt.

BACKGROUND

Big-game fishing, also referred to as offshore sportfishing, game fishing, or blue-water fishing, is a form of recreational fishing. Generally big-game fishing involves targeting large game fish, such as tuna, on a large body of water such as the ocean. Big-game fishing often involves a technique known as trolling. Fish are enticed by trolling fishing lures (e.g., lures designed to resemble squid or other baitfish) or other baits behind the boat. Multiple lines may be used that extend from multiple rods, such as rods secured in a gunwale of a boat. Moving a rod from one rod holder in a gunwale of a boat to another rod holder may be difficult when a large fish is hooked, and thus the rod may remain affixed to a single rod holder for the duration of fighting such a large fish.

SUMMARY

Provided in accordance with aspects of the present disclosure is a fishing rod butt including a tubular member defining a proximal end and a distal end. The distal end of the tubular member is configured to be coupled with a fishing rod. A gimbal assembly is supported at the proximal end of the tubular member. The gimbal assembly includes a gimbal rotatably coupled with the proximal end of the tubular member. The gimbal allows the tubular member to rotate with respect to the gimbal. A washer is arranged between the proximal end of the tubular member and the gimbal. The washer prevents the proximal end of the tubular member from directly contacting the gimbal.

In an aspect of the present disclosure, the distal end of the tubular member is configured to be removably coupled with the fishing rod.

In an aspect of the present disclosure, the gimbal is configured to allow the tubular member to rotate 360 degrees with respect to the gimbal.

In an aspect of the present disclosure, a tensioning assembly couples the gimbal with the proximal end of the tubular member. The tensioning assembly includes an extension member extending from the proximal end of the tubular member through a side of the gimbal adjacent the proximal end of the tubular member. A tensioning member is arranged about the extension member. The tensioning member directly contacts an inner surface of the gimbal to apply a range of tensions to the gimbal. The range of tensions applied to the gimbal corresponds with a range of forces needed to rotate the tubular member with respect to the gimbal.

In an aspect of the present disclosure, the extension member defines a first threading and the tensioning member defines a second threading configured to be rotatably engaged with the first threading of the extension member.

In an aspect of the present disclosure, the tensioning member is configured to apply sufficient tension to the inner surface of the gimbal to prevent rotation of the tubular member with respect to the gimbal.

In an aspect of the present disclosure, an open bottom portion is defined in the gimbal. The tensioning assembly is accessible through the open bottom portion of the gimbal.

In an aspect of the present disclosure, the tubular member defines a first longitudinal portion, a second longitudinal portion, and a curved portion connecting the first longitudinal portion and the second longitudinal portion.

In an aspect of the present disclosure, at least two orifices are formed in the gimbal. The orifices are configured to mate with a cross-bar of a rod holder to prevent rotation of the gimbal with respect to the cross-bar of the rod holder.

In an aspect of the present disclosure, a second washer is arranged between the proximal end of the tubular member and the gimbal. The second washer is in direct contact with the washer. One of the washer or the second washer is affixed to the proximal end of the tubular member or to the gimbal.

In an aspect of the present disclosure, one of the washers includes teflon.

Provided in accordance with aspects of the present disclosure is a gimbal assembly for a fishing rod butt includes a gimbal configured to be rotatably coupled with a proximal end of a fishing rod base defining a tubular member. The gimbal allows the tubular member of the fishing rod base to rotate with respect to the gimbal. A support member extends from the gimbal. The support member is configured for insertion into the tubular member of the fishing rod bas. A washer is arranged between the support member and the gimbal. The washer prevents the proximal end of the tubular member from directly contacting the gimbal.

In an aspect of the present disclosure, a tensioning assembly coupled is with the support member. The tensioning assembly includes an extension member extending from the support member through a side of the gimbal adjacent the support member. A tensioning member is arranged about the extension member. The tensioning member directly contacts an inner surface of the gimbal to apply a range of tensions to the gimbal. The range of tensions applied to the gimbal corresponds with a range of forces needed to rotate the support member with respect to the gimbal.

In an aspect of the present disclosure, the tensioning member is configured to apply sufficient tension to the inner surface of the gimbal to prevent rotation of the support member with respect to the gimbal.

BRIEF DESCRIPTION OF THE DRAWINGS

Various aspects and features of the present disclosure are described hereinbelow with reference to the drawings wherein.

DETAILED DESCRIPTION

Figure 1:
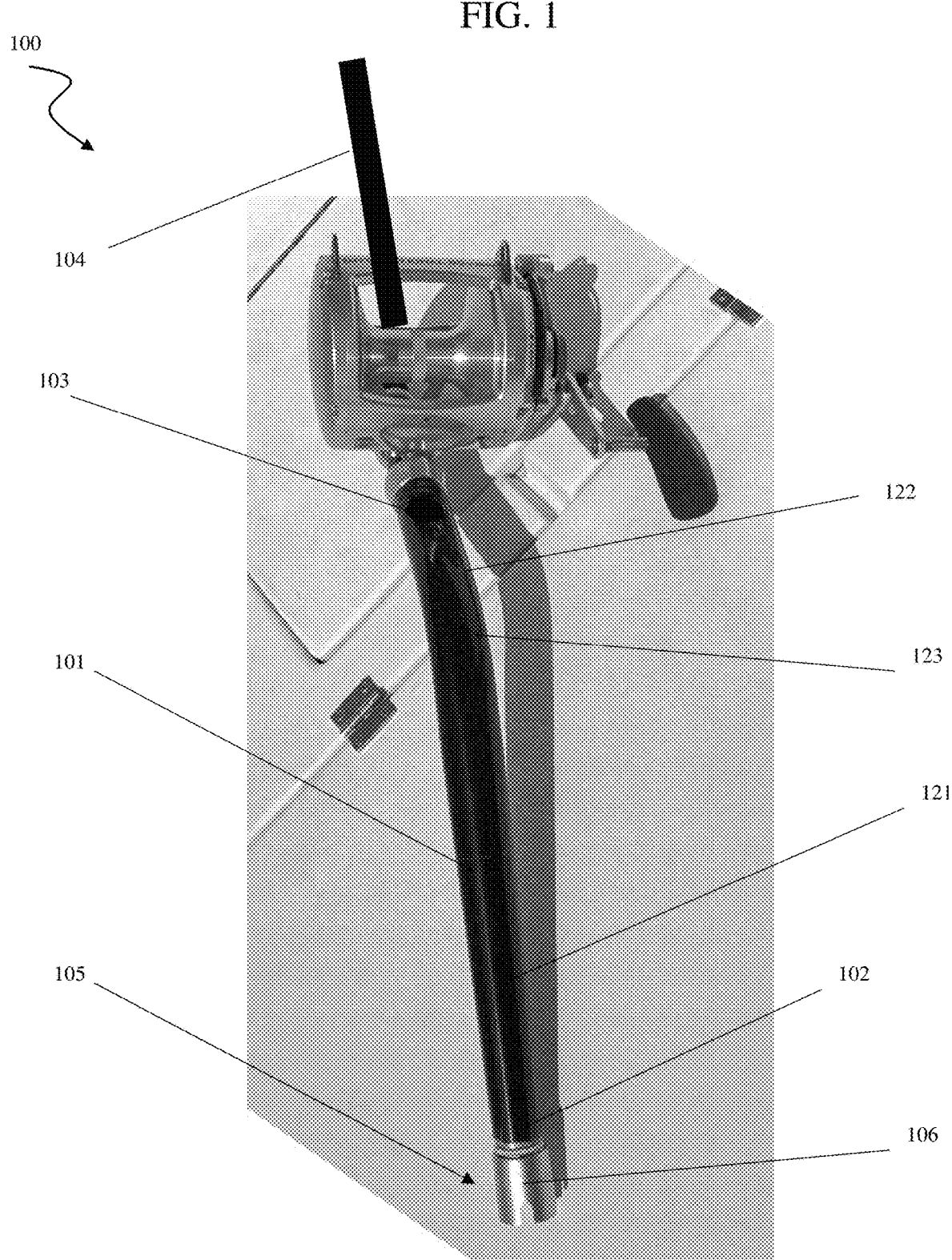
FIG. 1 is a perspective view of a fishing rod butt according to aspects of the present disclosure.
Figure 2:
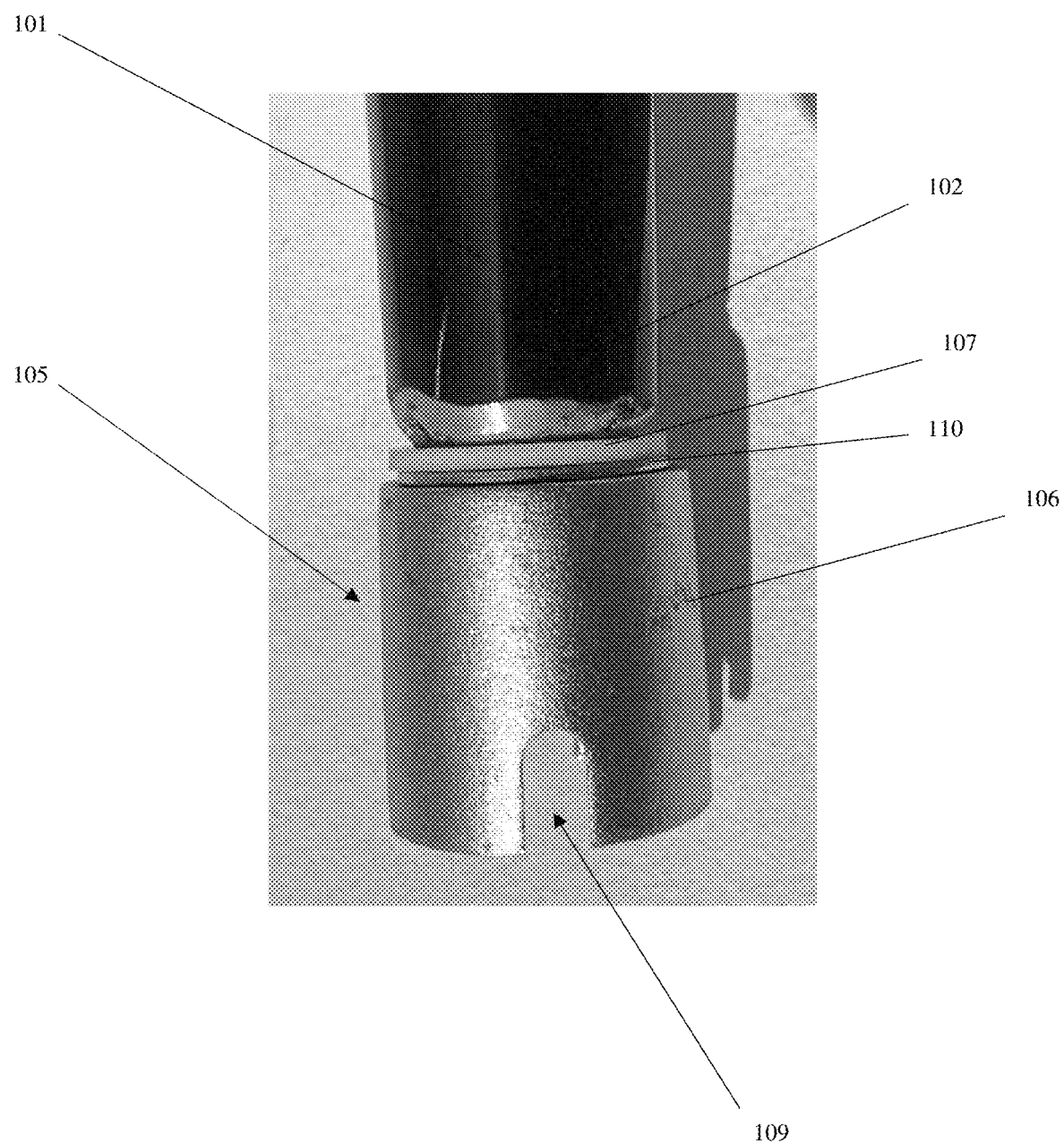
FIG. 2 is an enlarged, side view of the gimbal of the fishing rod butt of FIG. 1.

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

As used herein, the term "distal" refers to the portion that is being described which is further from a user, while the term "proximal" refers to the portion that is being described which is closer to a user.

Exemplary configurations of the disclosure will be described more fully below (e.g., with reference to the accompanying drawings). Like reference numerals may refer to like elements throughout the specification and drawings.

Referring to FIGS. 1-5, a fishing rod butt 100 includes a tubular member 101 defining a proximal end 102 and a distal end 103. The distal end 103 of the tubular member 101 is configured to be coupled with a fishing rod 104. The fishing rod butt 100 may be permanently affixed to the fishing rod 104 or may be removably coupled with the fishing rod 104. As an example, the tubular member 101 may include one or more threaded members configured to couple the tubular member 101 with a fishing rod. The fishing rod butt 100 is configured to secure the fishing rode 104 to a gunwale 610 of a boat (see, e.g., FIG. 5).

A gimbal assembly 105 is supported at the proximal end 102 of the tubular member 101. The gimbal assembly 105 includes a gimbal 106 rotatably coupled with the proximal end 102 of the tubular member 101.

In use, the gimbal 106 allows the tubular member 101 (and the fishing rod 104) to rotate with respect to the gimbal 106. That is, the gimbal 106 allows the fishing rod to rotate to various angles with respect to a boat, such as while fishing a fish. This allows an angle of the tip of the fishing rod 104 to naturally shift as a fish is swimming at various angles with respect to the boat. This prevents the need to move the fishing rod 104 to a different fishing rod holder in the gunwale 610 of the boat, and also maintains steady tension on the end of the fishing rod to prevent a fish from being lost while reeling the fish in toward the boat.

A washer 107 is arranged between the proximal end 102 of the tubular member 101 and the gimbal 106. The washer 107 prevents the proximal end 102 of the tubular member 101 from directly contacting the gimbal 106. In use, this prevents friction between the proximal end 102 of the tubular member 101 and the gimbal 106 and facilitates relatively smooth rotation of the gimbal 106.

In an aspect of the present disclosure, a second washer 110 is arranged between the proximal end 102 of the tubular member 101 and the gimbal 106. The second washer 110 is in direct contact with the washer 107. One of the washer 107 or the second washer 110 may be affixed to the proximal end 102 of the tubular member 101 or to the gimbal 106. One of the washers may include or may be formed of teflon. As an example, one of the washers may be affixed to the gimbal 106 and one of the washers may be affixed to the proximal end 102 of the tubular member 101.

Figure 3:
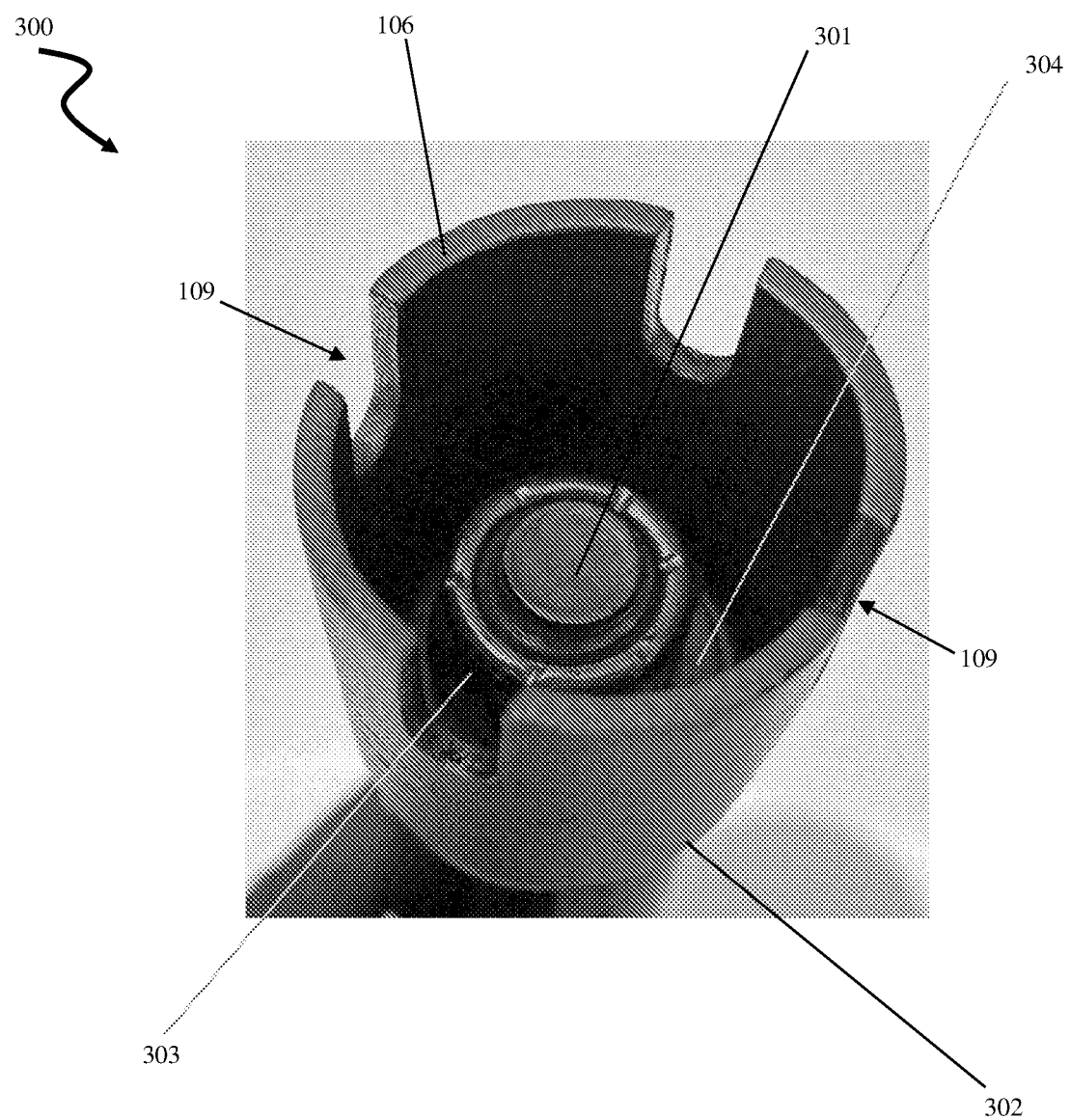
FIG. 3 is a bottom view of the gimbal of the fishing rod butt of FIG. 1.

Referring particularly to FIGS. 1 and 3, a tensioning assembly 300 couples the gimbal 106 with the proximal end 102 of the tubular member 101. The tensioning assembly 300 includes an extension member 301 extending from the proximal end 102 of the tubular member 101 through a side 302 of the gimbal 106 adjacent the proximal end 102 of the tubular member 101. A tensioning member 303 is arranged about the extension member 301. The tensioning member 303 directly contacts an inner surface 304 of the gimbal 106 to apply a range of tensions to the gimbal 106. The range of tensions applied to the gimbal 106 corresponds with a range of forces needed to rotate the tubular member 101 with respect to the gimbal 106.

In an aspect of the present disclosure, the extension member 301 defines a first threading and the tensioning member 303 defines a second threading configured to be rotatably engaged with the first threading of the extension member 301. As an example, the extension member 301 may be a threaded post and the tensioning member 303 may be a nut configured to be rotatably threaded onto the threaded post to contact and apply tension to the gimbal 106.

The tensioning member 303 is configured to apply sufficient tension to the inner surface 304 of the gimbal 106 to prevent rotation of the tubular member 101 with respect to the gimbal 106, as desired.

Figure 4:
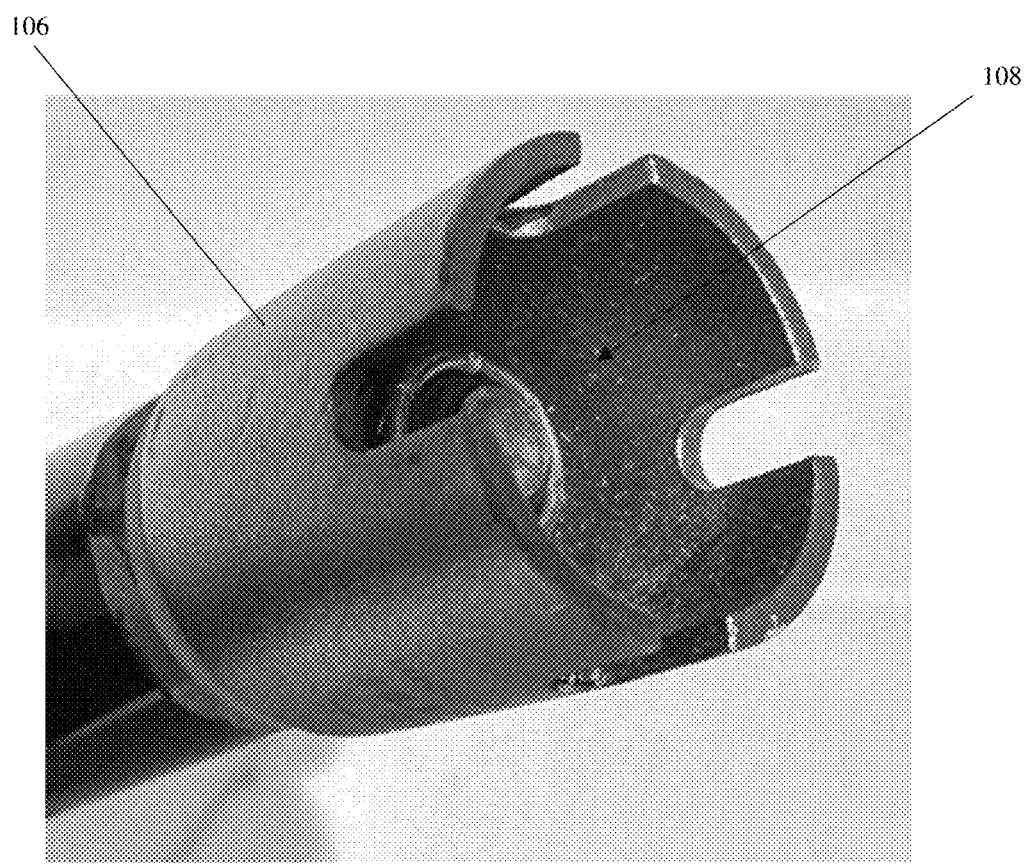
FIG. 4 is a bottom, perspective view of the gimbal of the fishing rod butt of FIG. 1.

Referring particularly to FIGS. 3-4, an open bottom portion 108 is defined in the gimbal 106. The tensioning assembly 300 is accessible through the open bottom portion 108 of the gimbal 106. The open bottom portion 108 allows the tensioning assembly 300 to be adjusted, as described herein, when the fishing rod butt 100 is outside of a gunwale 610 of a boat.

Referring again to FIG. 1, in an aspect of the present disclosure, the tubular member 101 defines a curved shape including a first longitudinal portion 121, a second longitudinal portion 122, and a curved portion 123 connecting the first longitudinal portion 121 and the second longitudinal portion 122. Alternatively, the tubular member 101 may define a substantially straight shape.

Referring particularly to FIG. 3, the gimbal 106 is configured to allow the tubular member 101 to rotate 360 degrees with respect to the gimbal 106 (see, e.g., curved arrows 301, 302 in FIG. 3 showing rotation of the gimbal 106, which will in turn correspondingly rotate the fishing rod 104, as described herein.

Referring particularly to FIGS. 1 and 6, at least two orifices 109 are formed in the gimbal 106. The orifices 109 are configured to mate with a cross-bar 601 of a rod holder 602 to prevent rotation of the gimbal (106 or 606) with respect to the cross-bar 601 of the rod holder 602. The orifices 109 are shaped, dimensioned and positioned such that the tensioning assembly 300 does not contact the cross-bar 601 (see, e.g., FIG. 5) of the boat, thus preventing damage to the tensioning assembly 300.

Figure 5:
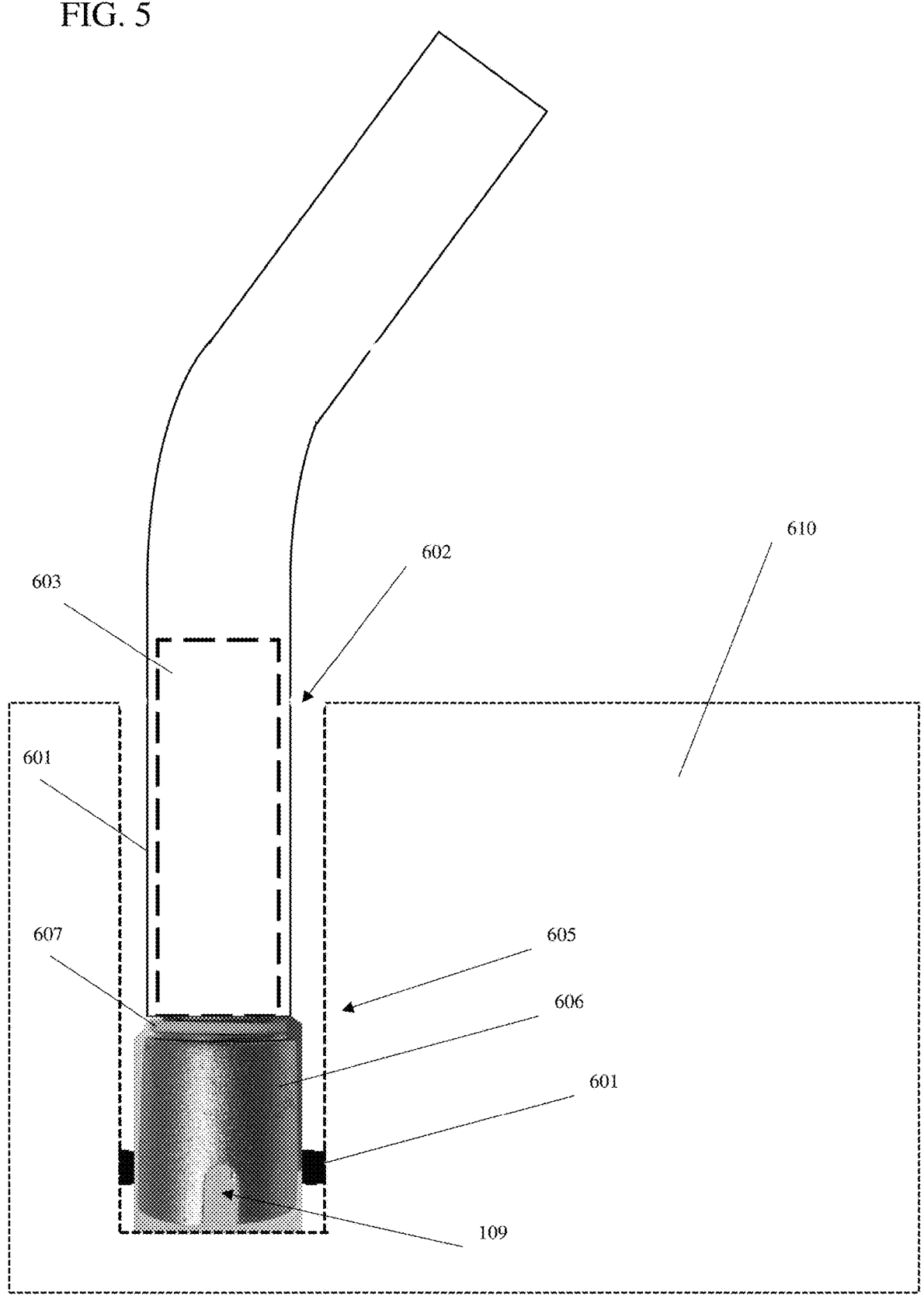
FIG. 5 is a schematic, cross-sectional view of a gimbal assembly supporting a fishing rod butt in a gunwale of a boat according to aspects of the present disclosure.

The gimbal assembly 605 described below with reference to FIG. 5 is substantially the same as the gimbal assembly 105 described above, unless otherwise indicated below. Thus, duplicative descriptions may be omitted below. Technical features described with reference to either of the gimbal assemblies 105, 605 are reciprocally available to each gimbal assembly wherever technically feasible. For example, while a support member 603 is described below with respect to gimbal assembly 605, a support member 603 may similarly be employed to gimbal assembly 105 to reinforce the strength of gimbal assembly 105 within tubular member 101. The gimbal assembly 605 may be employed for retrofitting an existing fishing rod butt for rotation with respect to a fishing rod holder in a gunwale of a boat.

With continued reference to FIG. 5, a gimbal assembly 605 for a fishing rod butt includes a gimbal 606 configured to be rotatably coupled with a proximal end of a fishing rod base defining a tubular member. The gimbal 606 allows the tubular member of the fishing rod base to rotate with respect to the gimbal 606. A support member 603 extends from the gimbal 606. The support member 603 is configured for insertion into the tubular member 601 of the fishing rod bas.

A washer 607 is arranged between the support member 603 and the gimbal 606, as described herein.

It will be understood that various modifications may be made to the aspects and features disclosed herein. Therefore, the above description should not be construed as limiting, but merely as exemplifications of various aspects and features. Those skilled in the art will envision other modifications within the scope and spirit of the claims appended thereto.

What is claimed is:

1. A fishing rod butt, comprising:
   a tubular member defining a proximal end and a distal end, the distal end of the tubular member configured to be coupled with a fishing rod;
   a gimbal assembly supported at the proximal end of the tubular member, the gimbal assembly including:
      a gimbal rotatably coupled with the proximal end of the tubular member, the gimbal configured to allow the tubular member to rotate with respect to the gimbal; and
      a washer arranged between the proximal end of the tubular member and the gimbal, the washer configured to prevent the proximal end of the tubular member from directly contacting the gimbal; and
   a tensioning assembly coupling the gimbal with the proximal end of the tubular member, the tensioning assembly including:
      an extension member extending from the proximal end of the tubular member through a side of the gimbal adjacent the proximal end of the tubular member; and
      a tensioning member arranged about the extension member, the tensioning member configured to directly contact an inner surface of the gimbal to apply a range of tensions to the gimbal, wherein the range of tensions applied to the gimbal corresponds with a range of forces needed to rotate the tubular member with respect to the gimbal.

2. The fishing rod butt of claim 1, wherein the extension member defines a first threading and the tensioning member defines a second threading configured to be rotatably engaged with the first threading of the extension member.

3. The fishing rod butt of claim 1, wherein the tensioning member is configured to apply sufficient tension to the inner surface of the gimbal to prevent rotation of the tubular member with respect to the gimbal.

4. The fishing rod butt of claim 1, further including an open bottom portion defined in the gimbal, wherein the tensioning assembly is accessible through the open bottom portion of the gimbal.

5. The fishing rod butt of claim 1, wherein the distal end of the tubular member is configured to be removably coupled with the fishing rod.

6. The fishing rod butt of claim 1, wherein the gimbal is configured to allow the tubular member to rotate 360 degrees with respect to the gimbal.

7. The fishing rod butt of claim 1, further including at least two orifices formed in the gimbal, the at least two orifices configured to mate with a cross-bar of a rod holder, the at least two orifices configured to prevent rotation of the gimbal with respect to the cross-bar of the rod holder.

8. The fishing rod butt of claim 1, wherein the washer includes teflon.

9. The fishing rod butt of claim 1, further including a second washer arranged between the proximal end of the tubular member and the gimbal, the second washer in direct contact with the washer, wherein one of the washer or the second washer is affixed to the proximal end of the tubular member or to the gimbal.

10. A fishing rod butt, comprising:
    a tubular member defining a proximal end and a distal end, the distal end of the tubular member configured to be coupled with a fishing rod; and
    a gimbal assembly supported at the proximal end of the tubular member, the gimbal assembly including:
       a gimbal rotatably coupled with the proximal end of the tubular member, the gimbal configured to allow the tubular member to rotate with respect to the gimbal; and
       a washer arranged between the proximal end of the tubular member and the gimbal, the washer configured to prevent the proximal end of the tubular member from directly contacting the gimbal,
    wherein the tubular member defines a first longitudinal portion, a second longitudinal portion, and a curved portion connecting the first longitudinal portion and the second longitudinal portion.

11. A gimbal assembly for a fishing rod butt, comprising:
    a gimbal configured to be rotatably coupled with a proximal end of a fishing rod base defining a tubular member, the gimbal configured to allow the tubular member of the fishing rod base to rotate with respect to the gimbal;
    a support member extending from the gimbal, the support member configured for insertion into the tubular member of the fishing rod base;
    a washer arranged between the support member and the gimbal, the washer configured to prevent the proximal end of the tubular member from directly contacting the gimbal; and
    a tensioning assembly coupled with the support member, the tensioning assembly including:
       an extension member extending from the support member through a side of the gimbal adjacent the support member; and
       a tensioning member arranged about the extension member, the tensioning member configured to directly contact an inner surface of the gimbal to apply a range of tensions to the gimbal, wherein the range of tensions applied to the gimbal corresponds with a range of forces needed to rotate the support member with respect to the gimbal.

12. The gimbal assembly of claim 11, wherein the extension member defines a first threading and the tensioning member defines a second threading configured to be rotatably engaged with the first threading of the extension member.

13. The gimbal assembly of claim 11, wherein the tensioning member is configured to apply sufficient tension to the inner surface of the gimbal to prevent rotation of the support member with respect to the gimbal.

14. The gimbal assembly of claim 11, further including an open bottom portion defined in the gimbal, wherein the tensioning assembly is accessible through the open bottom portion of the gimbal.

15. The gimbal assembly of claim 11, wherein the gimbal is configured to allow the support member to rotate 360 degrees with respect to the gimbal.

16. The gimbal assembly of claim 11, further including at least two orifices formed in the gimbal, the at least two orifices configured to mate with a cross-bar of a rod holder, the at least two orifices configured to prevent rotation of the gimbal with respect to the cross-bar of the rod holder.

17. The gimbal assembly of claim 11, wherein the washer includes teflon.

18. The gimbal assembly of claim 11, further including a second washer arranged between the washer and the gimbal.

* * * * *